United States Patent [19]

Buzas et al.

[11] 3,843,647
[45] Oct. 22, 1974

[54] DERIVATIVES OF PHENOXYACETIC ACIDS

[75] Inventors: André Buzas, Essone; Jacques Bruneau, Paris, both of France

[73] Assignee: Les Laboratoires Bruneau & Cie., Paris, France; a part interest

[22] Filed: June 8, 1972

[21] Appl. No.: 261,106

[30] Foreign Application Priority Data
June 11, 1971 France .............................. 71.21267
May 25, 1972 France ............................. 72.18645
May 25, 1972 France ............................. 72.18646

[52] U.S. Cl... 260/247.2 A, 260/553 R, 260/553 A, 260/559 A, 424/248, 424/322, 424/324
[51] Int. Cl............................................ C07d 87/42
[58] Field of Search..... 260/247.2 A, 553 R, 553 A, 260/559 A, 559 B

[56] References Cited
UNITED STATES PATENTS
2,830,008  4/1958  Barber et al. ......................... 167/65
3,081,302  3/1963  Shapiro et al. .................... 260/247.2

*Primary Examiner*—G. Thomas Todd
*Attorney, Agent, or Firm*—Armstrong, Nikaido & Wegner

[57] ABSTRACT

Phenoxyacetic acid derivatives of the formula :

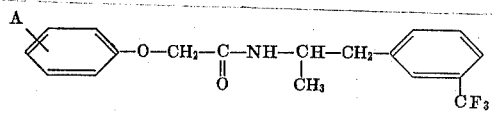

in which A is ortho, meta or para and is amino, acylamino, alkyl-, aryl-, or aralkyl-substituted amino, or ureido, and their salts have interesting pharmacological properties, e.g., as agents which cause anorexia.

6 Claims, No Drawings

DERIVATIVES OF PHENOXYACETIC ACIDS

The present invention provides, as new compounds, the phenoxyacetic acid derivatives of the formula:

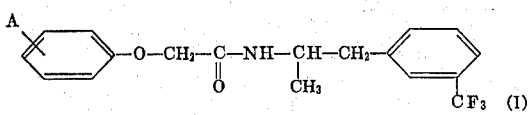

in which A can be in the ortho, meta or para position and represents $NH_2$, $RCONH$, $NHR_1$, $NR_2R_3$ or $NHCONR_4R_5$, R is hydrogen, or a linear or branched, satured or unsaturated, carbocyclic or heterocyclic aliphatic, arylaliphatic, aryloxy-aliphatic, carboxyaliphatic or aromatic radical; $R_1$, $R_2$ and $R_3$ each represent alkyl, aryl or aralkyl; and $R_4$ and $R_5$ each represent hydrogen, an alkyl, aryl or aralkyl radical or an aminoalkyl radical in which the amino group may or may not carry substituents or may be derived from a heterocyclic amine, and the pharmaceutically acceptable acid addition salts of those derivatives which are bases.

These compounds have a low toxicity and display pharmacological activity, especially as agents which cause anorexia, dispel anxiety and counteract inflammation. They are crystalline products, which are stable and soluble in the usual organic solvents.

Preferred compounds are those in which A, which is preferably in the para position, is-$NH_2$, $RCONH$— (where R is hydrogen or lower alkyl), or —$NHR_1$ (where $R_1$ is lower alkyl), e.g., —$NHC_2H_5$. Examples of such radicals are

and the RCONH radicals in which the RCO radical is formyl and acetyl.

According to a feature of the invention, the phenoxyacetic acid derivatives of formula I are made by reducing the 1-methyl-2-(m-trifluoromethyl-phenyl)-ethylamide of o, m or p-nitro-phenoxyacetic acid and then, when a compound in which A is other than —$NH_2$ is desired, reacting the compound so obtained with an acid RCOOH or a functional derivative thereof, or with an alkylating or arylating agent to introduce radicals $R_1$, $R_2$ and/or $R_3$ or with a reagent to introduce the ureido radical $NHCONR_4R_5$.

The starting material may be made by reacting ortho, meta or para-nitro-phenoxy-acetyl chloride with 1-methyl-2-(m-trifluoromethyl-phenyl)-ethylamine in an organic diluent, in particular benzene, toluene, chloroform or dichloroethane. The 1-methyl-2-(m-trifluoromethyl-phenyl)-ethylamide derivatives of o, m and p-nitro-phenoxyacetic acids are new.

The nitro compound so obtained is then reduced, e.g., by catalytic hydrogenation, so as to obtain the corresponding amino compound. This reduction can be carried out at atmospheric pressure and in an organic diluent, in particular ethyl alcohol or methyl alcohol.

In order to prepare the acylated derivatives (A = NHCOR), an acid chloride or anhydride of the acid RCOOH is preferably used. The reaction of the latter with the amino compound can be carried out in an organic diluent, in particular benzene, toluene, chloroform or dichloroethane. A crystalline product is finally obtained.

In order to prepare derivatives in which A is an $NHR_1$ group, in which $R_1$ is an alkyl radical, it is possible to reduce the corresponding acylated derivative using lithium aluminium hydride.

In order to convert the derivative in which A is an amino group into the correspondng derivative in which A is a ureido group $R_4R_5NCONH$—, the amino compound is first reacted with phenyl chloroformate or ethyl chloroformate or with phosgene, and the compound obtained is then reacted with the amine $R_4R_5NH$.

The following Examples illustrate the invention.

EXAMPLE 1

1-Methyl-2-(m-trifluoromethyl-phenyl)-ethylamide of p-amino-phenoxyacetic acid. (A = p—$NH_2$).

a. 1 Litre of dried and distilled chloroform and 195 g. (0.9 mol) of para-nitro-phenoxy-acetyl chloride are introduced successively into a three-necked 2 litre flask, equipped with a mechanical stirrer and a dropping funnel and in which a thermometer is immersed. The flask is cooled in a bath of ice and salt and 365.8 g. (1.8 mols) of 1-methyl-2-(m-trifluoromethyl-phenyl)-ethylamine are gradually added, with stirring and keeping the temperature at about 0°C. At the end of the addition, the mixture is allowed to return to ambient temperature and is left to stand overnight.

The chloroform solution is transferred into a separating funnel and successively washed twice with 250 ml. of 10 percent strength hydrochloric acid, twice with 250 ml. of a 10 percent strength aqueous sodium carbonate solution and, finally, with water until neutral. The chloroform extracts are dried over anhydrous sodium sulphate and then filtered and the solvent is driven off in vacuo. The residue is crystallised from about 500 ml. of ethanol. 278 g. (80 percent) of white crystals melting at 116°C. (Kofler) are obtained.

The other main physical constants of the 1-methyl-2-(m-trifluoromethyl-phenyl)-ethylamide derivative of p-nitrophenoxyacetic acid, produced in this way, are as follows:

Soluble in chloroform and ethyl alcohol
Infra-red absorption
maxima at $cm^{-1}$    3,280    3,080    1,660    1,600
                 1,585    1,550    1,490    1,445.

b. 38.25 g. (0.1 mol) of the product obtained according to (a), 500 ml. of ethanol and 200 mg. of platinum oxide are introduced successively into a hydrogenating flask of 1 litre capacity. The mixture is stirred vigorously in the presence of hydrogen at atmospheric pressure. When the theoretical amount of gas has been absorbed, a homogeneous and colourless solution is obtained which is filtered to remove the platinum. The solvent is then driven off in vacuo. 35 g. (98 percent) of a slightly coloured viscous oil are obtained. After crystallisation from isobutanol, the 1-methyl-2-(m-trifluoromethyl-phenyl)-ethylamide of p-amino-phenoxy-acetic acid so obtained forms white crystals melting at 70°C. The other main physical constants are as follows:

Soluble in chloroform-ethanol
Infra-red absorption
maxima at cm⁻¹   3,220   3,080   2,030   1,660
                 1,570   1,510   1,445.

EXAMPLE 2

1-Methyl-2-(m-trifluoromethyl-phenyl)-ethylamide of p-ethylamino-phenoxy-acetic acid and its hydrochloride (A = p—$C_2H_5NH$—).

200 ml. of anhydrous tetrahydrofuran are introduced into a three-necked 500 ml. flask, equipped with a mechanical stirrer, and then 2.28 g. (0.06 mol) of lithium aluminium hydride are gradually added. The flask is cooled in a bath of ice-cold water and 15.75 g. (0.04 mol) of the 1-methyl-2-(m-trifluoromethyl-phenyl)-ethylamide of p-acetylamino-phenoxyacetic acid (prepared as described in Example 1) are slowly added. At the end of the reduction, the mixture is allowed to return to ambient temperature and stirring is continued for 12 hours.

2 ml. of ethyl acetate are added to decompose the excess hydride. The flask is cooled in a bath of iced water and 5 ml. of water are gradually added. After filtration, the solvent is evaporated under reduced pressure and the residue is crystallised from a mixture of diethyl ether and petroleum ether. 11.4 g. (75 percent yield) of light yellow crystals, melting at 75°C., are obtained. They are soluble in chloroform and ethyl alcohol and show Infra-red absorption
maxima at cm⁻¹   3,310   1,640   1,540   1,510   1,440.

This base can be converted into the hydrochloride which forms beige crystals which melt at 122°–124°C. and are soluble in water.

EXAMPLE 3

1-Methyl-2-(m-trifluoromethyl-phenyl)-ethylamide of p-[2-morpholino-ethyl-carbamoyl-amino]-phenoxyacetic acid.

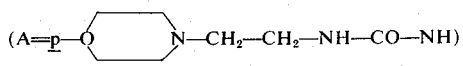

a. 250 ml. of ethanol and 25.5 g. (0.08 mol) of the 1-methyl-2-(m-trifluoromethyl-phenyl)-ethylamide of p-amino-phenoxy-acetic acid are introduced into a three-necked 500 ml. flask, equipped with a mechanical stirrer and two dropping funnels. Thereafter, 13.9 g. (0.088 mol) of phenyl chloroformate and a 10 percent aqueous solution of sodium carbonate are added, gradually and simultaneously, so as to keep the pH in the flask at between 5 and 7. At the end of the addition, stirring is continued for 30 minutes at ambient temperature, and the precipitate is then filtered off, and washed with water followed by ethanol. 32.2 g. (92 percent yield) of the 1-methyl-2-(m-trifluoromethyl-phenyl)-ethylamide of p-(phenoxy-carbonyl-amino)-phenoxyacetic acid are obtained as beige crystals melting at 135°C. (Kofler). It is slightly soluble in methanol and shows Infra-red absorption maxima
at cm⁻¹   3,370   3,250   1,730   1,655
          1,540   1,505   1,490   1,330.

b. 150 ml. of methanol, 23.6 g. (0.05 mol) of the product of a) and 7.2 g. (0.055 mol) of 2-morpholino-ethylamine are introduced into a three-necked 500 ml flask, equipped with a mechanical stirrer and a reflux condenser. The mixture is heated under reflux for 4 hours, with stirring. After cooling, the solvent is evaporated under reduced pressure, the residue is taken up in methylene chloride and the extract is washed twice with a 10 percent aqueous solution of sodium hydroxide and then three times with water. After drying over sodium sulphate, the solvent is evaporated under reduced pressure and the residue is crystallised from diethyl ether. 21 g. (83 percent) of white crystals melting at 80°C. (Kofler) are obtained. They are soluble in chloroform and ethyl alcohol, and show Infra-red absorption
maxima at cm⁻¹   3,410   1,675   1,600   1,500   1,325.

This base can be converted into the hydrochloride, which forms white crystals melting at 92°C., and is soluble in water.

EXAMPLE 4

1-Methyl-2-(m-trifluoromethyl-phenyl)-ethylamide of p-formylamino-phenoxyacetic acid. (A = P—CHONH—).

A mixture of 17.6 g. (0.05 mol) of the 1-methyl-2-(m-trifluoromethyl-phenyl)-ethylamide of p-amino-phenoxyacetic acid, obtained according to Example 1, and 2.53 g. (0.055 mol) of formic acid are heated for 5 hours on an oil bath at 170°C. After cooling, the mixture is taken up in water and extracted with methylene chloride. The extract is washed successively with a 10 percent solution of hydrochloric acid, a 10 percent solution of sodium carbonate, and then with water until neutral. It is dried over sodium sulphate, the solvent is driven off and the residue is crystallised from ethyl acetate. 14 g. (77 percent yield) of white crystals melting at 105°C. (Kofler) are obtained. They are soluble in chloroform and ethyl alcohol and show Infra-red absorption
maxima at cm⁻¹   3,260   1,655   1,550   1,510
                 1,505   1,450   1,400.

| Analysis | Calculated | Found |
| --- | --- | --- |
| C% | 60.02 | 60.02 |
| H% | 5.03 | 5.06 |
| N% | 7.35 | 7.32 |

EXAMPLE 5

1-Methyl-2-(m-trifluoromethyl-phenyl)-ethylamide of o-acetylamino-phenoxyacetic acid. (A = o—$CH_3CONH$—).

a. 1 Litre of dried and distilled chloroform and 160 g. (0.75 mol) of ortho-nitro-phenoxy-acetyl chloride are introduced successively into a three-necked 2 litre flask, equipped with a mechanical stirrer and a dropping funnel, and in which a thermometer is immersed. The flask is cooled in a bath of ice and salt and 306 g. (1.5 mols) of 1-methyl-2-(m-trifluoromethyl-phenyl)-ethylamine are added gradually, while stirring and keeping the temperature at about 0°C. At the end of the addition, the mixture is allowed to return to ambient temperature and is left to stand overnight. The chloroform solution is transferred into a separating funnel and is washed successively twice with 250 ml. of 10 percent strength hydrochloric acid, twice with 250 ml. of a 10 percent strength aqueous solution of sodium carbonate and finally with water until neutral. The chloroform extracts are dried over anhydrous sodium sulphate and then filtered, and the solvent is driven off in vacuo. The residue is crystallised from benzene. 226 g. (79 percent yield) of white crystals melting at 90°C. (Kofler) are obtained.

The other main physical constants of the 1-methyl-2-(m-trifluoromethyl)-ethylamide derivative of ortho-nitrophenoxyacetic acid, obtained in this way, are as follows:

Soluble in chloroform and ethyl alcohol
Infra-red absorption
maxima at cm$^{-1}$   3,390   1,670   1,610   1,580
              1,525   1,440.

b. 38.25 g. (0.1 mol) of the compound obtained according to a) and 500 ml. of ethanol as well as 200 mg. of platinum oxide are introduced successively into a hydrogenating 1 litre flask. The mixture is stirred vigorously in the presence of hydrogen at atmospheric pressure. When the theoretical amount of gas has been absorbed, a homogeneous and colourless solution is obtained which is filtered to remove the platinum, and the solvent is then driven off in vacuo. 35 g. (98 percent yield) of a slightly coloured viscous oil are obtained.

c. 150 ml. of chloroform, 5.93 g. of pyridine and 26.4 g. (0.075 mol) of the compound obtained according to (b) are introduced successively into a three-necked 500 ml. flask, equipped with a mechanical stirrer and a dropping funnel, and in which a thermometer is immersed. The flask is cooled in a bath of ice and salt, and 5.88 g. (0.075 mol) of acetyl chloride are gradually added, while stirring and keeping the temperature at about 0°C. When the addition is finished, the mixture is allowed to return to ambient temperature and is then heated for 3 hours at 50°C. After cooling, the reaction mixture is transferred into a separating funnel and is washed successively with 10 percent hydrochloric acid, water, 10 percent aqueous solution of sodium carbonate, and finally with water until neutral. The chloroform extracts are dried over sodium sulphate and then filtered. The solvent is driven off in vacuo and the residue is crystallised from ethanol. 24.3 g. (82 percent yield) of white crystals melting at 145°C. are obtained. They are soluble in chloroform and ethyl alcohol and show Infra-red absorption
maxima at cm$^{-1}$   3,260   1,670   1,640   1,600   1,530
              1,490   1,450   1,430.

EXAMPLE 6

1-Methyl-2-(m-trifluoromethyl-phenyl)-ethylamide of m-acetylamino-phenoxyacetic acid. (A =m—CH$_3$CONH—).

a. 1 Litre of dried and distilled chloroform and 160 g. (0.75 mol) of meta-nitro-phenoxy-acetyl chloride are introduced successively into a three-necked 2 litre flask, equipped with a mechanical stirrer and a dropping funnel, and in which a thermometer is immersed. The flask is cooled in a bath of ice and salt and 306 g. (1.5 mols) of 1-methyl-2-(m-trifluoromethyl-phenyl)-ethylamine are added gradually, while stirring and keeping the temperature at about 0°C. At the end of the addition, the mixture is allowed to return to ambient temperature and is left to stand overnight. The chloroform solution is transferred into a separating funnel and washed successively twice with 250 ml. of 10 percent hydrochloric acid, twice with 250 ml. of a 10 percent aqueous solution of sodium carbonate, and finally with water until neutral. The chloroform extracts are dried over anhydrous sodium sulphate and then filtered and the solvent is driven off in vacuo. The residue is crystallised from a benzene-cyclohexane mixture. 203 g. (71 percent yield) of white crystals melting at 92°C. (Kofler) are obtained. They are soluble in chloroform and ethyl alcohol and show Infra-red absorption
maxima at cm$^{-1}$   3,310   3,080   1,655   1,530   1,480
              1,450   1,440.

b. 38.25 g. (0.1 mol) of the compound obtained according to (a), 500 ml. of ethanol and 200 mg. of platinum oxide are introduced successively into a 1 litre hydrogenating flask. The mixture is stirred vigorously in the presence of hydrogen at atmospheric pressure. When the theoretical amount of gas has been absorbed, a homogeneous and colourless solution is obtained which is filtered to remove the platinum, and the solvent is then driven off in vacuo. 35 g. (98 percent yield) of a slightly coloured viscous oil are obtained.

c. 100 ml. of chloroform, 3.95 g. of pyridine and 17.6 g. (0.05 mol) of the product obtained according to (b) are introduced successively into a three-necked flask of 250 ml capacity equipped with a mechanical stirrer and a dropping funnel, and in which a thermometer is immersed. The flask is cooled in a bath of ice and water and 3.93 g. (0.05 mol) of acetyl chloride are added gradually, while stirring and keeping the temperature at about 0°C. When the addition is finished, the mixture is allowed to return to ambient temperature and is then heated for 3 hours at 50°C. After cooling, the reaction mixture is transferred to a separating funnel and is washed successively with 10 percent hydrochloric acid, water, a 10 percent aqueous solution of sodium carbonate, and then finally with water until neutral. The chloroform extracts are dried over sodium sulphate and then filtered. The solvent is driven off in vacuo and the residue is crystallised from benzene. 15.2 g. (77 percent yield) of white crystals melting at 124°C. are obtained. They are soluble in chloroform and ethyl alcohol and show Infra-red absorption
maxima at cm$^{-1}$   3,280   1,645   1,600   1,560   1,530
              1,490

EXAMPLE 7

1-Methyl-2-(m-trifluoromethyl-phenyl)-ethylamide derivative of p-acetylamino-phenoxyacetic acid. (A = p—CH$_3$CONH—).

a. 1 Litre of dried and distilled chloroform and 195 g. (0.9 mol) of para-nitro-phenoxy-acetyl chloride are introduced successively into a three-necked 2 litre flask, equipped with a mechanical stirrer and a dropping funnel, and in which a thermometer is immersed. The flask is cooled in a bath of ice and salt and 365.8 g. (1.8 mols) of 1-methyl-2-(m-trifluoromethylphenyl)-ethylamine are added gradually, while stirring and keeping the temperature at about 0°C. At the end of the addition, the mixture is allowed to return to ambient temperature and is left to stand overnight. The chloroform solution is transferred to a separating funnel and washed successively twice with 250 ml. of 10 percent hydrochloric acid, twice with 250 ml. of a 10 percent aqueous solution of sodium carbonate, and finally with water until neutral. The chloroform extracts are dried over anhydrous sodium sulphate and then filtered and the solvent is driven off in vacuo. The residue is crystallised from about 500 ml. of ethanol. 278 g. (80 percent) of white crystals melting at 116°C. (Kofler) are obtained. The other main physical constants of the 1-methyl-2-(m-trifluoromethyl-phenyl)-ethylamide derivative of p-nitro-phenoxyacetic acid, obtained in this way, are as follows.

Soluble in chloroform and ethyl alcohol
Infra-red absorption
maxima at cm$^{-1}$    3,280    3,080    1,660    1,600
               1,585    1,550    1,490    1,445.

b. 38.25 g. (0.1 mol) of the compound obtained according to a), 500 ml. of ethanol and 200 mg. of platinum oxide are introduced successively into a 1 litre hydrogenating flask. The mixture is stirred vigorously in the presence of hydrogen at atmospheric pressure. When the theoretical amount of gas has been absorbed, a homogeneous and colourless solution is obtained which is filtered to remove the platinum, and the solvent is then driven off in vacuo. 35 g. (98 percent) of a slightly coloured viscous oil are obtained. After it has been crystallised from isobutanol, the 1-methyl-2-(m-trifluoromethyl-phenyl)-ethylamide of p-aminophenoxyacetic acid so obtained forms white crystals melting at 190°C. The other main physical constants are as follows:

Soluble in chloroform and ethanol
Infra-red absorption
maxima at cm$^{-1}$    3,220    3,080    2,030    1,660    1,570
               1,510    1,445.

c. 500 ml. of chloroform, 21.8 g. of pyridine and 105 g. (0.275 mol) of the compound obtained according to (b) are introduced successively into a three-necked 1 litre flask, equipped with a mechanical stirrer and a dropping funnel, and in which a thermometer is immersed. The flask is cooled in a bath of ice and salt and 21.6 g. (0.275 mol) of acetyl chloride are added gradually, while stirring and keeping the temperature at about 0°. When the addition is finished, the mixture is allowed to return to ambient temperature and is then heated for 3 hours at 50°C. After cooling, the reaction mixture is transferred to a separating funnel and is washed successively with 10 percent hydrochloric acid, water, a 10 percent aqueous solution of sodium carbonate, and finally with water until neutral. The chloroform extracts are dried over sodium sulphate and then filtered. The solvent is driven off in vacuo and the residue is crystallised from about 400 ml. of benzene. 90 g. (84 percent) of white crystals melting at 118°C. are obtained. They are soluble in chloroform and ethanol and show:

Infra-red absorption
maxima at cm$^{-1}$    3,280    1,655    1,550    1,505
               1,445    1,410

The compounds of the present invention have been subjected to the following pharmacological tests:

ANTI-INFLAMMATORY ACTIVITY (Carragenine-induced plantar oedema in the rat according to WINTER, Proc. Expl. Biol. Med., 1962, 3 515).

Sub-plantar oedema is induced by intradermal injection of a carragenine suspension (0.05 ml. of a 0.2 percent strength solution). The extent of the oedema is measured with an electric plethysmometer 3 hours after the injection of carragenine. The activity of the compounds under test administered orally 1 hour before the carragenine is calculated relative to a control batch and is expressed as a percentage relative to phenylbutazone. All the compounds and the phenylbutazone are administered at a dose of 60 mg/kg.

SEDATIVE ACTIVITY (Potentiation of narcosis in the mouse).

The products are administered orally 45 minutes before a liminal dose of sodium mebubarbital. The number of animals asleep (loss of the turning reflex) is noted every 5 minutes over a period of 1 hour. The activity is recorded using an arbitrary assessment of 0 to ++++.

ANOREXIGENIC ACTIVITY in the rat.

Six months old female rats (weighing 350 to 450 g.) are trained to absorb a constant amount of standard food (U.A.R. granules) over a period of 7 hours per day. The products to be tested are administered orally 30 minutes before the food is presented. The amount of food which has been consumed after 7 hours is measured, and the percentage decrease in the amount of food consumed relative to the average consumption of the same batch in the absence of treatment is calculated, for each batch. The 50 percent effective dose (dose which decreases of 50 percent the amount of food consumed) is calculated using a scale of doses. (According to J. C. Le Donarec J. Pharmacol. (Paris) 1970 1N° 3 419-422.)

ANXIETY-DISPELLING ACTIVITY (Four plate experiment with mice, according to BOISSIER, Europ. J. Pharmac., 1968, 4,145).

Naive mice (i.e., mice which have not previously been used in the same test) are placed in a chamber, the floor of which consists of four metal plates connected to a stimulator (100 volts ½ second). The animal receives a shock each time it crosses the plates. The number of shocks is counted over a period of 1 minute. The compounds are administered orally 30 minutes before the experiment (all the compounds are administered at a dose of 50 mg/kg). The percentage increase— or decrease — relative to a control batch is calculated.

MOTILITY EXPERIMENT

Naive mice to which 200 mg/kg. of compound under test have been administered orally are placed in an actograph with light beams according to the method of BOISSIER and SIMON (Arch. Int. Pharmacodyn., 1961, 158, 212). The variations in motility relative to control mice which received only the excipient, is noted.

TOXICITY in mice after oral administration
Calculations according to KARBER and BEHRENS (Arch. Expl. Pathol. Pharmacol., 1931, 162, 48).
The results are listed in Table I which follows.

The following formulation has given good clinical results: It is taken as an Example:

| 1-Metyl-2-(m-trifluoromethyl-phenyl)-ethylamide of p-acetylamino-phenoxyacetic acid | 0.03 g |
| Excipient: talc, lactose | 0.07 g |
| for a gelatine-coated pill of | 0.10 g |

TABLE I

| Example | LD$_{50}$ (p.o.) mice (mg/kg) | Anti-inflammatory action (phenyl-butazone = 100) | Potentiation of narcosis | Actographic variation of motility (%) | Anorexigenic activity ED$_{50}$(mg/kg) | Anxiety-dispelling activity |
|---|---|---|---|---|---|---|
| 1 | 350 | 69 | ++++ | −20% | 7.0 | + 230% |
| 2 | 1,000 | 150 | ++++ | No change in motility | 15.0 | + 140% |
| 3 | 400 | 92 | +++ | −19% | 10.0 | + 29% |
| 4 | 1,200 | 45 | +++ | No change in motility | 40.0 | + 45% |
| 5 | >1,600 | 80 | ++ | " | >120 | + 10% |
| 6 | >1,600 | 25 | ++++ | +28% | >120 | + 70% |
| 7 | 3,750 | 95 | +++ | No change in motility | 35.0 | + 45% |

The compounds of the present invention can be used in human medicine and in veterinary medicine because of the properties indicated above.

The 1-methyl-2-(m-trifluoromethyl-phenyl)-ethylamide of p-amino-phenoxy-acetic acid, the 1-methyl-2-(m-trifluoromethyl-phenyl)-ethylamide of p-acetylamino-phenoxy-acetic acid, and the 1-methyl-2-(m-trifluoromethyl-phenyl)-ethylamide of p-formylamino-phenoxyacetic acid, the 1-methyl-2-(m-trifluoromethyl-phenyl)-ethylamide of p-ethylamino-phenoxy-acetic acid and the 1-methyl-2-(m-trifluoromethyl-phenyl)-ethylamide of p-[2-morpholino-ethyl-carbamoyl-amino] phenoxyacetic acid have an anorexigenic effect which is devoid of side effects but is accompanied by anxiety-dispelling and anti-inflammation properties. These compounds do not have any stimulant properties which many substances used as anorexigenic agents possess.

The invention includes within its scope pharmaceutical compositions comprising, in association with a pharmaceutical carrier, at least one compound of formula I or salt thereof.

These compounds are especially suitable for oral administration, e.g., as gelatine-coated pills, preferably at the rate of one or two pills one hour before the main meals.

We claim:
1. A phenoxyacetic acid derivative of the formula

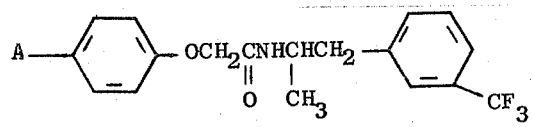

wherein A is amino, HCONH—, (C$_{1-3}$alkyl)CONH— or (C$_{1-3}$alkyl)NH— and the pharmaceutically acceptable acid addition salts thereof.

2. The 1-methyl-2-(m-trifluoromethyl-phenyl)-ethylamide of p-amino-phenoxy-acetic acid and its pharmaceutically acceptable acid addition salts.

3. The 1-methyl-2-(m-trifluoromethyl-phenyl)-ethylamide of p-formylamino-phenoxy-acetic acid.

4. The 1-methyl-2-(m-trifluoromethyl-phenyl)-ethylamide of o, m or p-acetylamino-phenoxy-acetic acid.

5. The 1-methyl-2-(m-trifluoromethyl-phenyl)-ethylamide of p-ethylamino-phenoxy-acetic acid and its pharmaceutically acceptable acid addition salts.

6. The 1-methyl-2-(m-trifluoromethyl-phenyl)-ethylamide of p-[2-morpholino-ethyl-carbamoyl-amino]-phenoxyacetic acid and its pharmaceutically acceptable acid addition salts.

* * * * *